July 22, 1947.                M. WATTER                2,424,523
                    AIRCRAFT OPERATING MECHANISM
                  Filed March 6, 1943         4 Sheets-Sheet 1
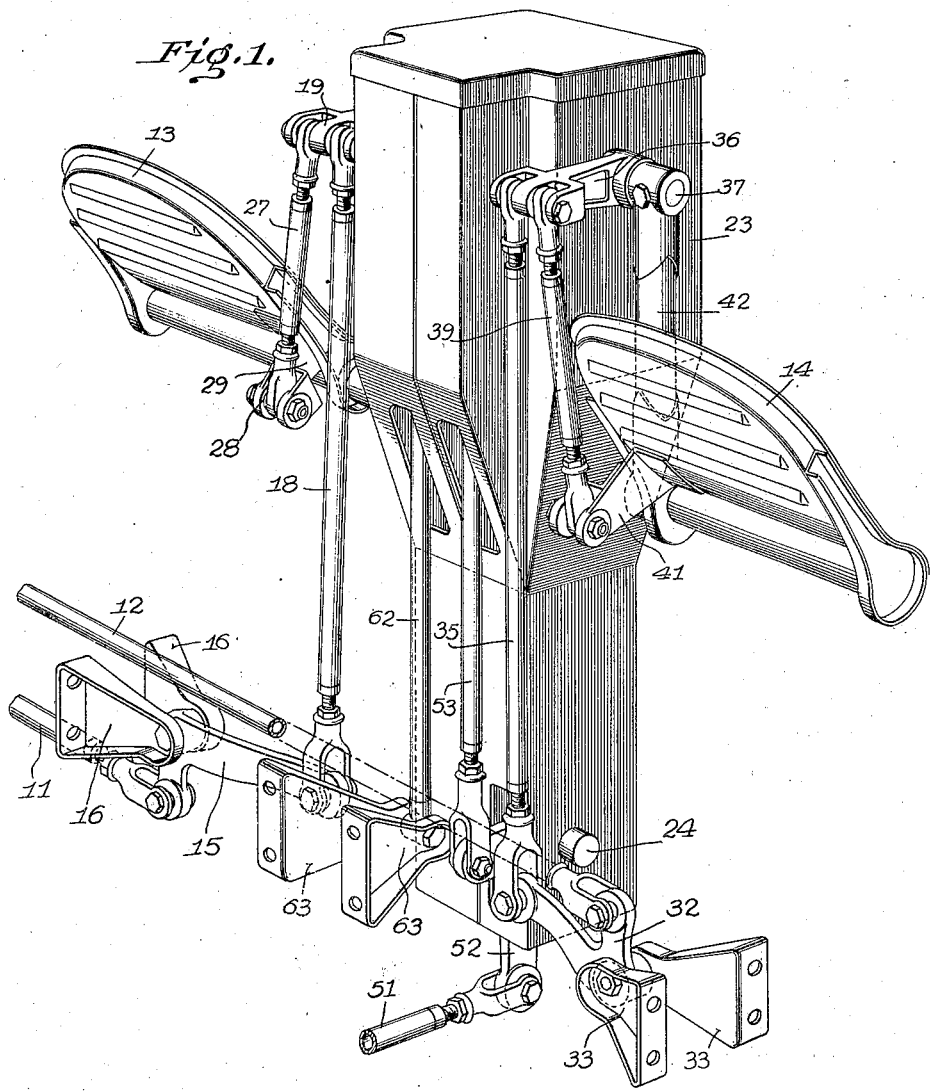
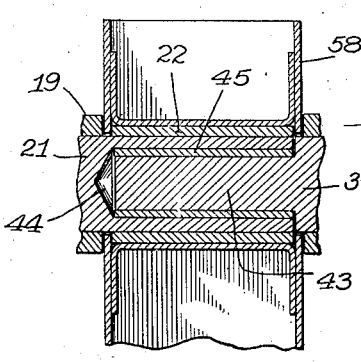
INVENTOR
Michael Watter
BY John P. Tarbox
ATTORNEY

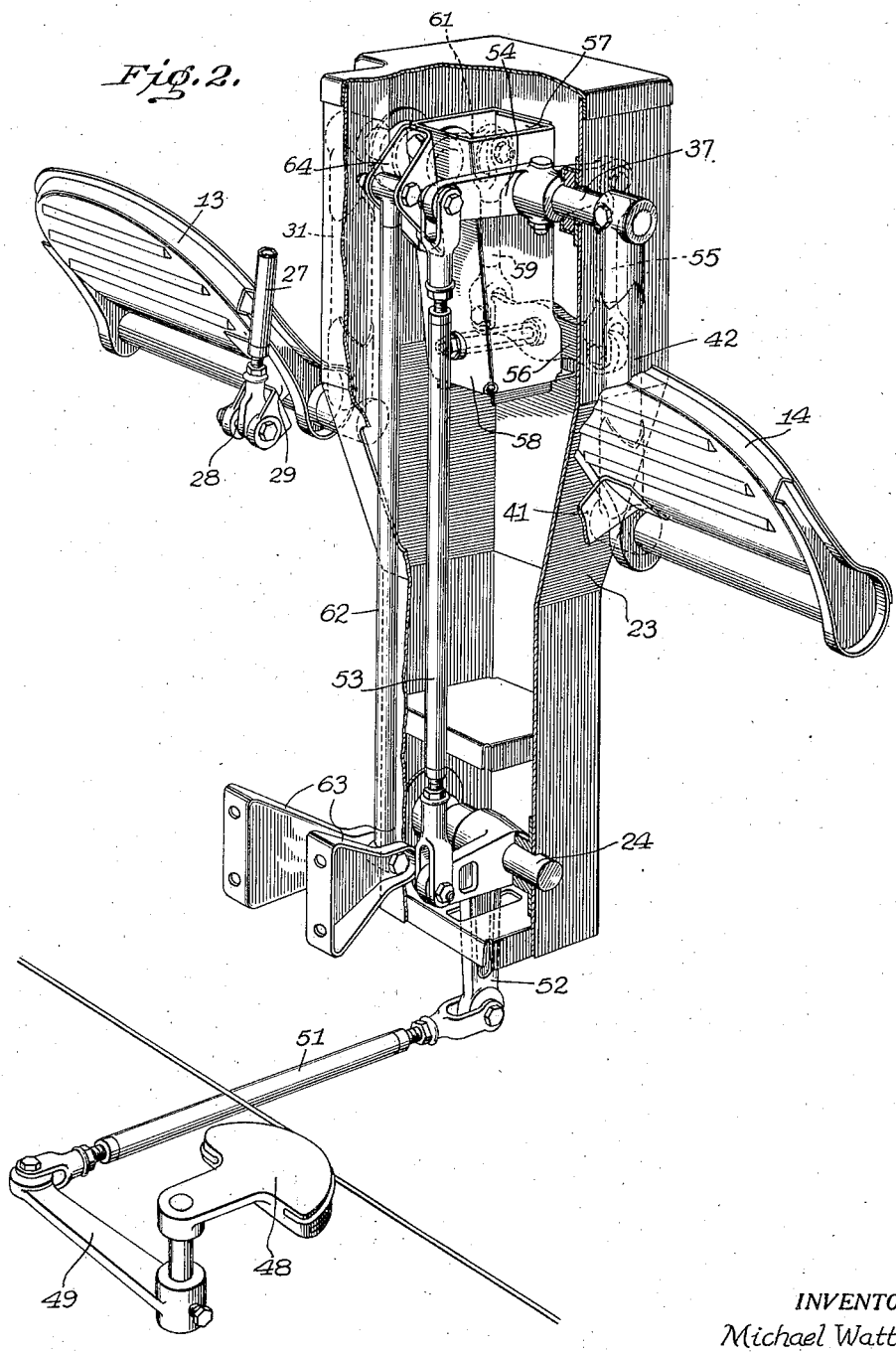

July 22, 1947.  M. WATTER  2,424,523
AIRCRAFT OPERATING MECHANISM
Filed March 6, 1943  4 Sheets-Sheet 3

INVENTOR
Michael Watter.
BY John P. Tarbox
ATTORNEY

July 22, 1947.                M. WATTER                2,424,523
              AIRCRAFT OPERATING MECHANISM
              Filed March 6, 1943          4 Sheets-Sheet 4
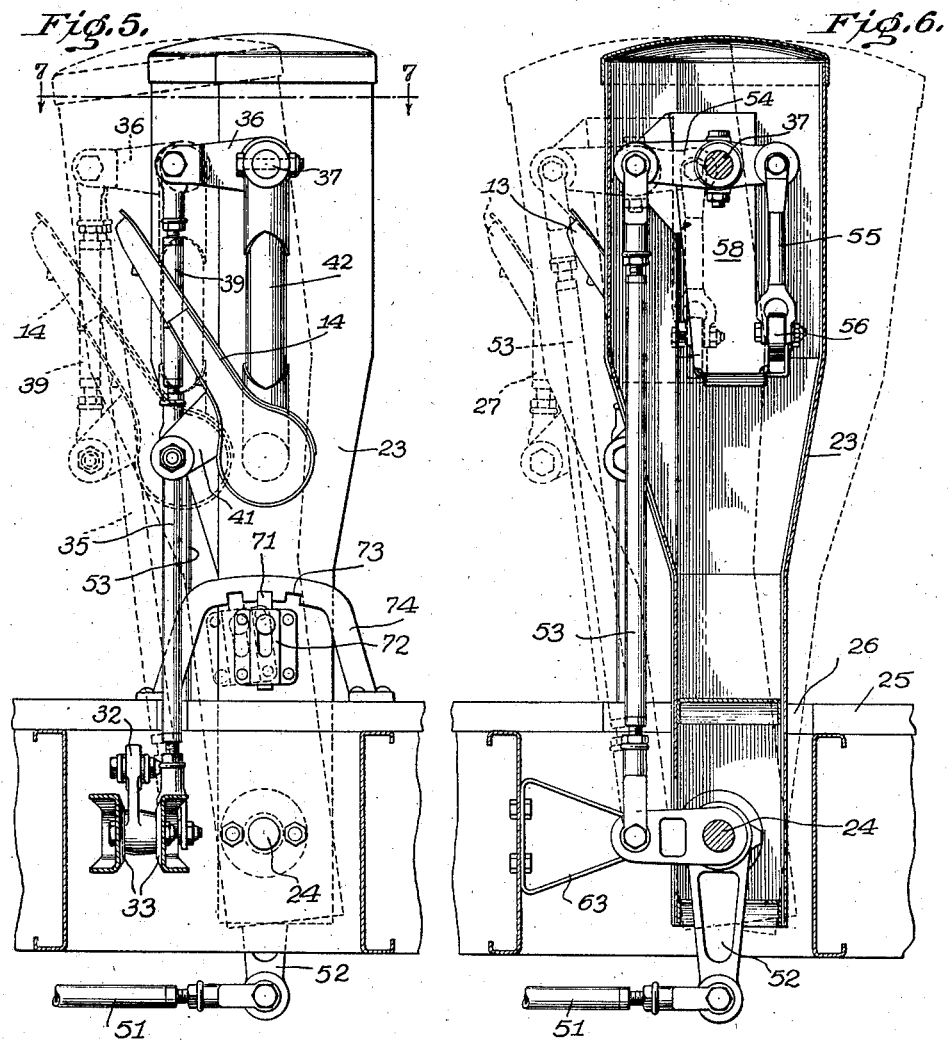
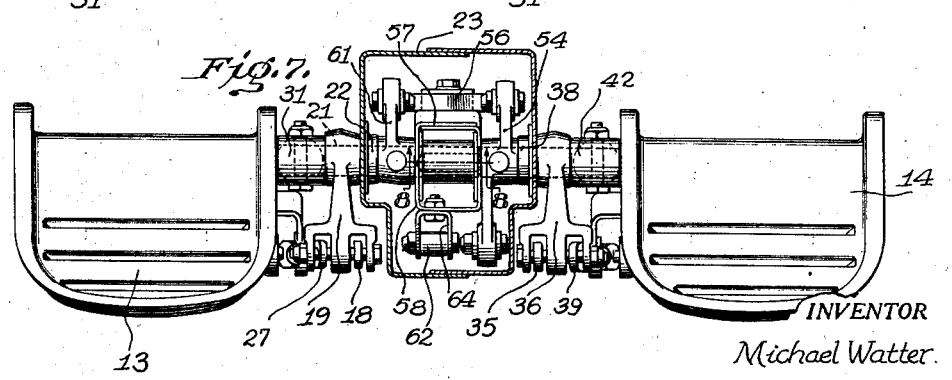
INVENTOR
Michael Watter.
BY John P. Tarbox
ATTORNEY Patented July 22, 1947

2,424,523

UNITED STATES PATENT OFFICE 2,424,523

AIRCRAFT OPERATING MECHANISM

Michael Watter, Philadelphia, Pa., assignor to The Budd Company, Philadelphia, Pa., a corporation of Pennsylvania Application March 6, 1943, Serial No. 478,233

14 Claims. (Cl. 244—86)

This invention relates to control mechanisms and particularly to mechanisms employed in controlling such devices as the rudder and brakes of an airplane, although it will be apparent from the following description that the invention is not limited to any particular field of use, but is, on the contrary, of general adaptation.

It is now customary in airplane controls to employ foot pedals for both operating the rudder and controlling separately the application of the right and left wheel brakes. In order to accommodate pilots of varying leg length it is desirable to provide for adjustment of the pedals toward and from the pilot seat, and an object of this invention is to provide an improved control mechanism constructed and arranged to permit adjusting the pedal positions without disturbing or affecting the associated control mechanism itself.

A further object is to provide an adjustable control mechanism which will be substantially free from all play in the control linkages.

A still further object is to provide a control mechanism for airplanes of the dual pedal type constructed and arranged to permit easy adjustment of the pedal position without affecting the relative positions of the pedals themselves.

These and other objects which will be apparent are attained by the present invention, one embodiment of which is illustrated in the accompanying drawings.

Figure 3:
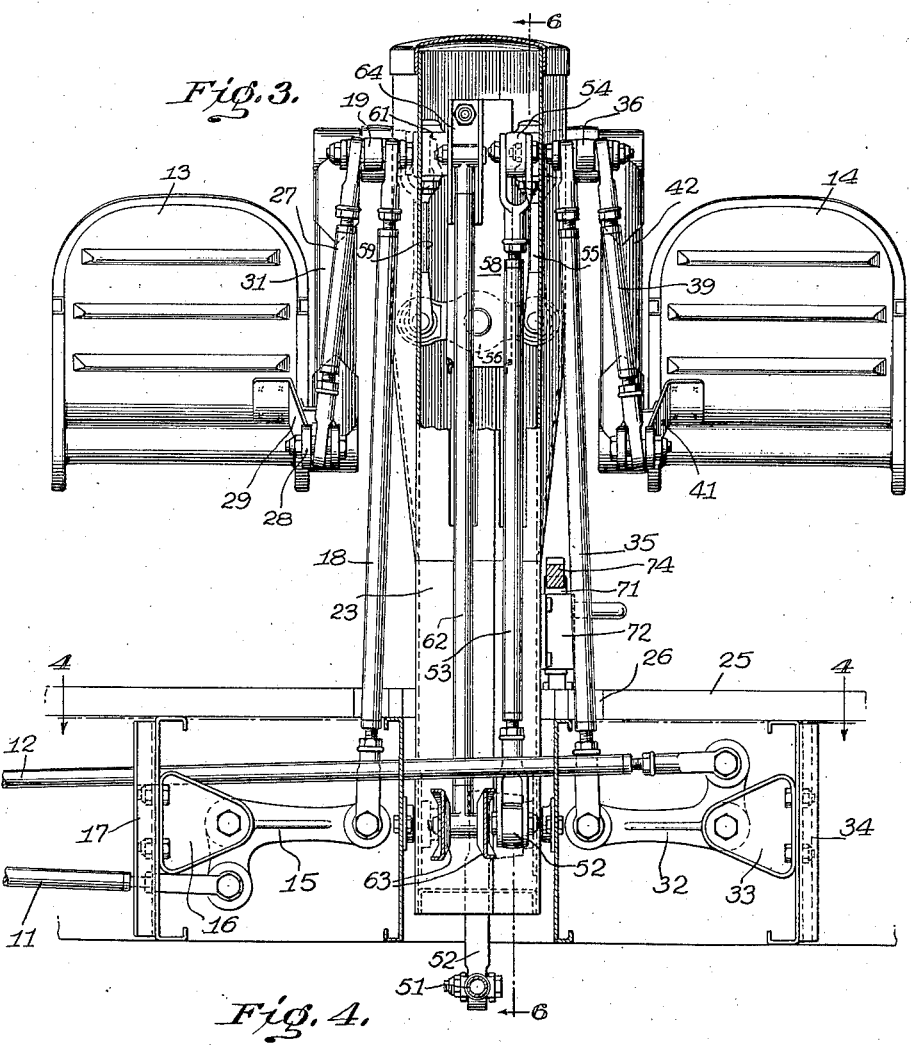
Figure 4:
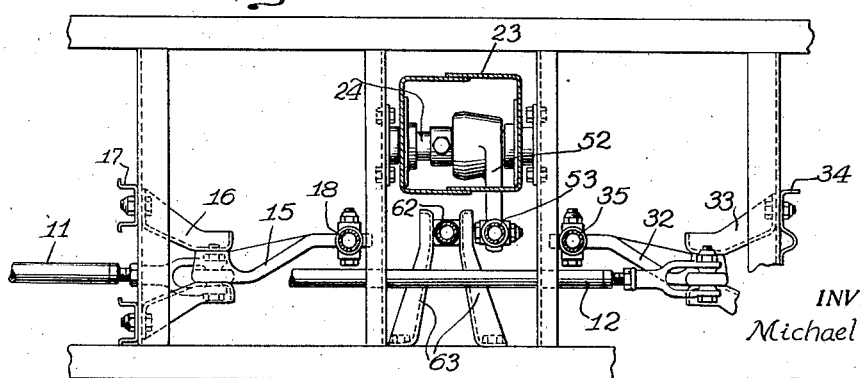

Fig. 1 is a perspective view of a control mechanism constructed in accordance with one embodiment of this invention, Fig. 2 is a similar view with the wall of the supporting pedestal broken away to show the interior parts, Fig. 3 is a side elevation, partly in section, of the control mechanism shown in Fig. 1, Fig. 4 is a transverse sectional view on the line 4—4 of Fig. 3, Fig. 5 is a side elevation on a somewhat reduced scale of the mechanism shown in Fig. 1, indicating in dotted lines one pedal adjusting movement of the supporting pedestal and associated parts, Fig. 6 is a similar view, partly in section through the pedestal, showing both fore and aft adjustments of the pedestal, Fig. 7 is a transverse sectional view on the line 7—7 of Fig. 5, and Fig. 8 is a section on the line 8—8 of Fig. 7.

The present invention relates to a control mechanism for airplanes in which right and left pedals are connected to a rudder controlling sector, or the like, for suitable operation of the rudder to steer to the right or left depending upon whether the pressure is applied to the right or left pedal. The mechanism includes a reversing lever so that steering movement of one pedal causes the other pedal to move in the opposite direction, and vice versa. Each pedal is also connected to one brake operating mechanism for one of the wheels whereby operation of the right pedal produces application of the brakes to the right wheel of the undercarriage, and operation of the left pedal produces application of the brakes to the left wheel, while operation of both pedals simultaneously causes both brakes to be applied.

The illustrated embodiment of the present invention is shown in connection with a pair of brake rods 11 and 12, connected respectively to the right and left brake mechanisms (not shown) and adapted to be independently actuated by right and left pedals 13 and 14, respectively. The right brake rod 11 is connected to the short arm of a bell crank lever 15 pivoted on a bracket 16 mounted on a stationary part 17 of the airplane structure. The long arm of the bell crank lever 15 is universally connected to a link 18 and through it and a pin joint to a crank arm 19 rotatably supported on a stub shaft 21 rotatably supported in a bearing collar 22 on one side wall of a pedestal 23 supported for pivotal adjustment on a pivot 24 mounted below the floor 25 of the cockpit, the pedestal being extended downwardly through an opening 26 in the floor. An operating link 27 connects the crank 19 to a bracket 28 on an arm 29 projecting outwardly from the lower side of the right pedal 13. The pedal is pivotally supported in the lower end of a hanger 31 secured to the end of the shaft 21 adjacent the crank arm 19.

The left wheel brake rod 12 is similarly connected to the short arm of a bell crank lever 32 pivoted to brackets 33 mounted on a structural part 34 of the plane structure and having a long arm universally connected to a link 35 and through it and a pin joint to a crank arm 36 rotatably mounted on a stub shaft 37 supported in a bearing collar 38 mounted on the opposite wall of the pedestal 23 from the stub shaft 21. A link 39 connects the crank arm 36 with a bracket arm 41 secured on the bottom of the left pedal 14. The left pedal is pivotally supported at the lower end of a hanger 42 secured to the projecting end of the shaft 37 next to the crank arm 36.

It will be apparent that movement of each pedal about its pivotal support will operate the associated crank arm 19 or 36 and, through the links 18 and 35 and rods 11 and 12, actuate the brake mechanism associated with the right and left wheels of the undercarriage, and that the pedals may be simultaneously or independently moved for actuating the brakes together or selectively.

The stub shafts 21 and 37 have their inner ends telescoped together, see Fig. 8, to maintain the shafts in alignment and for mutually supporting each other. The shaft 37 has a reduced extension 43 extending into a recess 44 in the shaft 21, a bearing sleeve 45 being interposed therebetween.

A single rudder controlling and operating sector 48 has a crank arm 49 connected by a rudder rod 51 to one arm of a bell crank lever 52 pivotally supported on the same pivot 24 which supports the pedestal 23. The other arm of the bell crank lever is connected by a link 53 to one end of a walking beam 54 secured to the shaft 37, on which is also secured the left pedal hanger 42. The other end of the walking beam 54 is connected by a link 55 to one end of a reversing or equalizing lever 56 pivoted in the lower end of the rear wall 57 of a rectangular casing 58 which is rotatably supported on the inner, interconnected ends of the shafts 21 and 37. The opposite end of the lever 56 is connected by a link 59 to a crank arm 61 secured to the inner end of the shaft 21 on which the right pedal 13 is also mounted.

It will be noted that the horizontal arm of the bell crank lever 52 is parallel to the walking beam 54 to which it is connected by the link 53, and that, when the parts are in neutral position, the crank arm 61 is similarly parallel to both the walking beam 54 and the horizontal arm of the bell crank lever 52.

A fixed link 62 is pivoted at one end, on an axis coincident with the connection between the rudder link 53 and the bell crank lever 52, in a supporting bracket 63 mounted on a fixed part of the airplane structure, and the upper end of the link is pivoted to a bracket 64 secured to the adjacent wall of the casing 58 on a line substantially coaxial with the adjacent end of the walking beam 54 to which the upper end of the rudder link 53 is connected.

In the illustrated embodiment, the pedestal 23 can be moved from the central vertical position about the pivot 24 to a forward position shown in dotted lines in Fig. 5 to provide increased leg room for the pilot, or to a rear position shown in dotted lines in Fig. 6 to shorten the leg room, or it might be placed in vertical, intermediate position. It can be locked in any adjusted position by any suitable means such, for example, as a spring pressed lug 71 slidably mounted in a bracket 72 on the side of the pedestal in position to engage notches 73 formed in the edge of curved bar 74 fastened to the floor 25. If desired, a helical spring (not shown) can be connected between the pedestal and a fixed part of the plane structure to bias the pedestal in one direction.

It will be apparent that the horizontal arm of the bell crank lever 52, the connecting link 53, walking beam 54, and pedestal 23 constitute a parallelogram, and that the fixed link 62 upon movement of the supporting pedestal 23 to one adjusted position or another maintains the parallelogram relation of the parts with the horizontal arm of the bell crank lever as a relatively fixed link. As a result, it will be apparent that adjustment of the pedal position can be obtained without disturbing or affecting the associated control mechanism, and without causing any change in the position of either the brake rods 11 and 12 or the rudder rod 51 as a result of pedal adjustment, and without affecting or changing the positions of the two pedals relative to each other. For example, referring to Figs. 5 and 6, assuming that the supporting pedestal is moved from the central position shown in solid lines to the forward position shown in dotted lines in order to obtain more leg room, the fixed link 62 operates to maintain the parallel arrangement of the parts as shown in their neutral position, the pedal hangers 31, 42 remain vertical, the walking beam 54 and crank 61 are held horizontal and parallel to the horizontal arm of the bell crank lever 52, which latter thus remains unaffected and unmoved by the adjustment. It should also be noted that the brake operating crank arms 19 and 36 are positioned generally in the plane of the walking beam 54, and the brake links 18 and 35 substantially in the plane of the rudder link 53 with the universal connections between the brake links 18, 35 and the bell cranks 15 and 32 located substantially on the axis extending through the lower ends of the rudder link 53 and the fixed link 62. As a result, the parallelogram arrangement is also effective to maintain the pedal actuated crank arms 19 and 36 horizontal, and prevent operation of the brake rods 11 and 12 as a result of adjusting movement of the pedestal 23.

As illustrated, the brake links 18 and 35, rudder link 53 and rudder rod 51 are of the turnbuckle type for adjustment as to length for the purpose of eliminating all play from the control linkage. It will be obvious that when play is once eliminated, adjustment of the pedals can be obtained without producing any loose play in such linkage.

Although a specific embodiment of this invention has been described in detail, it will be apparent that the invention is not limited thereto but can be variously modified and adapted within the scope of the appended claims.

What is claimed is:

1. The combination in a control mechanism for aircraft, of a rudder-operating rod, a bell crank lever pivoted for movement about a fixed center, and having one arm connected to said rod, right and left pedals connected together in opposition and connected to the other arm of said bell crank lever, a support for said pedals mounted for pivotal movement about said center to adjust the position of said pedals, and means for maintaining fixed the position of said pedals relative to each other on said support during adjusting movement of said pedal support.

2. The combination in a control mechanism, of an actuating member having a pivoted arm movable about a fixed center, a crank arm parallel to said pivoted arm, a link connecting said arms, oppositely connected means for moving said crank arm to operate said pivoted arm, a support for said operating means pivoted for movement about said center to adjust the position of said operating means, said arms, link, and support forming a parallelogram structure, a second link pivoted at one end on a center substantially colinear with the connection between said first link and said pivoted arm when in neutral position and lying substantially in the plane of said first-named link, and means connecting the other end of said link to said crank arm so as to maintain said oppositely connected means in equalized position with said elements in the form of a parallelogram structure with said pivoted arm as a fixed side, upon movement of said support about said center.

3. The combination in a control mechanism for aircraft, of an actuating member having a pivoted arm movable about a fixed center, a shaft, a crank arm secured to said shaft and extending parallel to said pivoted arm, a support pivoted on said fixed center and carrying said shaft and crank arm, a link connecting said arms, a pedal connected to said shaft for rotating said shaft, a second shaft, a pedal connected thereto for rotating said second shaft, a crank arm connected to said second shaft, and means on said support connecting said last named crank arm to said first shaft including a reversing gear, whereby pressure on one pedal moves said actuating member in one direction and pressure on the other pedal moves said actuating member in the other direction and said support can be adjusted without changing the position of said pedals relative to each other.

4. The combination in a control mechanism for aircraft of an actuating member having a pivoted arm movable about a fixed center, a shaft, a crank arm secured to said shaft and extending parallel to said pivoted arm, a link connecting said arms, a pedal connected to said shaft for rotating said shaft, a second shaft, a pedal connected thereto for rotating said second shaft, a crank arm connected to said second shaft, means connecting said last named crank arm to said first shaft including a reversing gear, whereby pressure on one pedal moves said actuating member in one direction and pressure on the other pedal moves said actuating member in the other direction, a support for said shafts, pedals, and reversing gear, movable about said fixed center to adjust the positions of said pedals, and means for maintaining the relative positions of said pedals fixed during adjusting movement of said support.

5. The combination in a control mechanism for aircraft, of an actuating member having a pivoted arm movable about a fixed center, a shaft, a crank arm secured to said shaft and extending parallel to said pivoted arm, a link connecting said arms, a pedal connected to said shaft for rotating said shaft, a second shaft, a pedal connected thereto for rotating said second shaft, a crank arm connected to said second shaft, means connecting said last named crank arm to said first shaft including a reversing gear, whereby pressure on one pedal moves said actuating member in one direction and pressure on the other pedal moves said actuating member in the other direction, a support for said shafts, pedals and reversing gear, movable about said fixed center to adjust the positions of said pedals, means for maintaining the relative positions of said pedals fixed during adjusting movement of said support, separate brake actuating rods, and means connecting said rods to said pedals for operation independently of said actuating member.

6. The combination in a control mechanism for aircraft, of an actuating member having a pivoted arm movable about a fixed center, a shaft, a walking beam secured to said shaft and extending parallel to said pivoted arm, a link connecting the adjacent ends of said walking beam and said pivoted arm, a pedal connected to said shaft for rotating said shaft, a second shaft coaxial with said first shaft, a pedal connected thereto for rotating said second shaft, a crank arm connected to said second shaft, means including a reversing lever connecting said last-named crank arm to the other end of said walking beam, whereby pressure on one pedal moves said actuating member in one direction and pressure on the other pedal moves said actuating member in the opposite direction, a support for said shafts pivoted for movement about said fixed center to adjust the positions of said pedals, and means for maintaining said crank arm and said walking beam in a fixed relationship during adjustment of said support.

7. The combination in a control mechanism for aircraft, of an actuating member having a pivoted arm movable about a fixed center, a shaft, a walking beam secured to said shaft and extending parallel to said pivoted arm, a link connecting the adjacent ends of said walking beam and said pivoted arm, a pedal connected to said shaft for rotating said shaft, a second shaft coaxial with said first shaft, a pedal connected thereto for rotating said second shaft, a crank arm connected to said second shaft, means including a reversing lever connecting said last named crank arm to the other end of said walking beam whereby operation of one pedal moves said actuating member in one direction and operation of the other pedal moves said actuating member in the opposite direction, a support for said shafts pivoted for movement about said fixed center to adjust the position of said pedals together relative to a fixed point, a mounting for said walking beam pivoted on the support on the axis of said shafts, and a second link pivoted at one end to a fixed bracket substantially colinear with the connection between said first link and said pivoted arm, connected at the other end to said walking beam mounting and lying substantially in the plane of said first-named link, whereby said crank arm and said walking beam are maintained in a given relationship during adjustment of said support 8. The combination in a control mechanism for aircraft, of an actuating member having a pivoted arm movable about a fixed center, a shaft, a walking beam secured to said shaft and extending parallel to said pivoted arm, a link connecting the adjacent ends of said walking beams and said pivoted arm, a pedal pivoted on an arm connected to said shaft for rotating said shaft, a second shaft coaxial with said first shaft, a second pedal pivoted on an arm connected to said second shaft for rotating said second shaft, a crank arm connected to said second shaft, means including a reversing lever connecting said last-named crank arm to the other end of said walking beam, whereby operation of one pedal moves said actuating member in one direction and operation of the other pedal moves said actuating member in the opposite direction, a support for said shafts pivoted for movement about said fixed center to adjust the position of said pedals together relative to a fixed point, separate brake actuating rods, means connecting said rods to said pedals for operation independently of said actuating member, and means for maintaining said crank arm and said walking beam in a given relationship during adjustment of said support.

9. Control mechanism for aircraft, as for wheel brakes and rudder, comprising in combination, an adjustable main support mounted for shifting movement, as to accommodate the stature of the operator, a first control means including two parts pivotally mounted on the main support so as to be movable with and also movable relative to said main support during and in any adjustment, said control parts moving in opposite directions relative to each other, a sub-support mounted for pivotal movement on the main support, equalizing means mounted on the sub-support and connecting said two parts of the first control means to cause them to move together but in opposite directions, and a second control including a part pivotally mounted on each of the two parts of said first control means so as to be movable with and relative thereto during and in any adjustment.

10. Control mechanism for aircraft, as for wheel brakes and rudder, comprising in combination, an adjustable main support mounted for shifting movement, as to accommodate the stature of the operator, a first control means including two parts pivotally mounted on the main support so as to be movable with and also movable relative to said main support during and in any adjustment, said control parts moving in opposite directions relative to each other, a sub-support mounted for pivotal movement on the main support, equalizing means mounted on the sub-support and connecting said two parts of the first control means to cause them to move together but in opposite directions, and a second control including a part pivotally mounted on each of the two parts of said first control means so as to be movable with and relative thereto during and in any adjustment, said main support being mounted for pivotal movement about an axis, and said parts of the first control means, said sub-support, and elements operated by said parts of the second control means being mounted to turn about a common sub-support axis on said main support, said sub-support axis being spaced from the axis of the main support.

11. Control mechanism for aircraft, as for wheel brakes and rudder, comprising in combination, an adjustable main support mounted for shifting movement, as to accommodate the stature of the operator, a first control means including two parts pivotally mounted on the main support so as to be movable with and also movable relative to said main support during and in any adjustment, said control parts moving in opposite directions relative to each other, a sub-support mounted for pivotal movement on the main support, equalizing means mounted on the sub-support and connecting said two parts of the first control means to cause them to move together but in opposite directions, and a second control including a part pivotally mounted on each of the two parts of said first control means so as to be movable with and relative thereto during and in any adjustment, said sub-support having operating linkage elements and said first and second control means having operating linkage elements, which operating elements of the sub-support and the control means form with said main support parallelograms of linkages, two pivot axes of the parallelogram formed by the main support and the linkage of the sub-support occupying fixed positions, one of which is the pivot axis of the main support.

12. Control mechanism for aircraft, as for wheel brakes and rudder, comprising in combination, an adjustable support, a first movable control means operatively mounted on said support for bodily movement therewith by means including mounting connections between said first control means and said support providing independent operative movement of said first control means relative to said support in any adjusted position of said support, second control means operatively mounted upon said first control means and having bodily movement with said first control means and said support upon adjusting movement of said first control means and said support, the mounting connections for said second control means providing independent operative movement of said second control means relative to said first control means and said support, and operating connections between each of said control means and operative parts disposed off said support, said operating connections being operatively connected respectively with each of said control means and said operative parts and so related to the adjusting motion of the support as to maintain the operative relationship of said control means and said operative parts disposed off said support substantially constant regardless of the adjusted position of said support.

13. Control mechanism for aircraft, as for wheel brakes and rudder, comprising in combination, an adjustable support, a first movable control means operatively mounted on said support for bodily movement therewith by means including mounting connections between said first control means and said support providing independent operative movement of said first control means relative to said support in any adjusted position of said support, second control means operatively mounted upon said first control means and having bodily movement with said first control means and said support upon adjusting movement of said first control means and said support, the mounting connections for said second control means providing independent operative movement of said second control means relative to said first control means and said support, and operating connections between each of said control means and operative parts disposed off said support, said operating connections being operatively connected respectively with each of said control means and said operative parts, and so related to the adjusting motion of the support as to maintain the operative relationship of said control means and said operative parts disposed off said support substantially constant regardless of the adjusted position of said support, said support being adjustable about a center of movement and said operating connections emerging from said support near its center of adjusting movement so as to be substantially unchanged in position when the support is adjusted.

14. Control mechanism for aircraft, as for wheel brakes and rudder, comprising in combination, an adjustable support, a first movable control means operatively mounted on said support for bodily movement therewith by means including mounting connections between said first control means and said support providing independent operative movement of said first control means relative to said support in any adjusted position of said support, second control means operatively mounted upon said first control means and having bodily movement with said first control means and said support upon adjusting movement of said first control means and said support, the mounting connections for said second control means providing independent operative movement of said second control means relative to said first control means and said support, and operating connections between each of said control means and operative parts disposed off said support, said operating connections being operatively connected respectively with each of said control means and said operative parts, and so related to the adjusting motion of the support as to maintain the operative relationship of said control means and said operative parts disposed off said support substantially constant regardless of the adjusted position of said support, said support being adjustable about a center of movement and said operating connections emerging from said support near its center of adjusting movement so as to be substantially unchanged in position when the support is adjusted, and the operating connections for at least one of said control means emerging from said support at a limited predetermined distance from the center of adjusting movement of the support to make a slight compensation in the position of the control means when the support is adjusted.

MICHAEL WATTER.

REFERENCES CITED

The following references are of record in the file of this patent:

UNITED STATES PATENTS

| Number | Name | Date |
| --- | --- | --- |
| 1,746,008 | Minshall | Feb. 4, 1930 |
| 1,462,531 | Baumann | July 24, 1923 |
| 1,666,761 | Waite, Jr. | Apr. 17, 1928 |
| 1,605,398 | Fairey | Nov. 2, 1926 |
| 2,066,375 | Truman | Jan. 5, 1937 |

FOREIGN PATENTS

| Number | Country | Date |
| --- | --- | --- |
| 271,460 | Great Britain | Mar. 22, 1928 |